(12) United States Patent
Choi et al.

(10) Patent No.: US 7,662,732 B2
(45) Date of Patent: Feb. 16, 2010

(54) METHOD OF PREPARING PATTERNED CARBON NANOTUBE ARRAY AND PATTERNED CARBON NANOTUBE ARRAY PREPARED THEREBY

(75) Inventors: Seong Jae Choi, Seoul (KR); Kwang Soo Seol, Suwon-si (KR); Jae Young Choi, Suwon-si (KR); Dong Kee Yi, Seoul (KR); Seon Mi Yoon, Yongin-si (KR)

(73) Assignee: Samsung Electronics Co., Ltd. (KR)

( * ) Notice: Subject to any disclaimer, the term of this patent is extended or adjusted under 35 U.S.C. 154(b) by 53 days.

(21) Appl. No.: 11/615,360

(22) Filed: Dec. 22, 2006

(65) Prior Publication Data

US 2007/0273264 A1 Nov. 29, 2007

(30) Foreign Application Priority Data

May 26, 2006 (KR) ...................... 10-2006-0047465

(51) Int. Cl.
*H01J 19/06* (2006.01)
(52) U.S. Cl. ...................... 438/800; 977/742
(58) Field of Classification Search ................. 438/800; 977/842, 855, 952, 742, 847, 848, 762, 843, 977/858; 423/447.1, 447.2, 447.3; 257/E51.04
See application file for complete search history.

(56) References Cited

U.S. PATENT DOCUMENTS 6,359,288 B1 * 3/2002 Ying et al. .................... 257/14

7,169,374 B2 * 1/2007 Siochi et al. ............. 423/447.3
2007/0001220 A1 * 1/2007 Tombler et al. ............. 257/330
2007/0017633 A1 * 1/2007 Tonkovich et al. .......... 156/300

FOREIGN PATENT DOCUMENTS

KR 1020050035191 4/2005
KR 1020050108122 11/2005

OTHER PUBLICATIONS

Z. Chen et al, "Mechanisms for Formation of a One-Dimensional Horizontal Anodic Aluminum Oxide Nanopore Array on a Si Substrate", Oct. 26, 2005, J. of the Electrochemical Society, vol. 152, No. 12, pp. D227-D231.*
Masuda et al, "Fabrication of a one-dimensional microhole array by anodic oxidation of aluminum", Dec. 6, 1993, Applied Physics Letters, vol. 63, No. 23, pp. 3155-3157.*
Cojocaru et al, "Conformal anodic oxidation of aluminum thin films", Mar. 1, 2005, Nano Letters, vol. 5, No. 4, pp. 675-680.*

* cited by examiner

*Primary Examiner*—David Vu
*Assistant Examiner*—Suberr Chi
(74) *Attorney, Agent, or Firm*—Cantor Colburn LLP

(57) ABSTRACT

A method of preparing a patterned carbon nanotube array a patterned carbon nanotube array prepared thereby are provided. The method includes forming carbon nanotubes in channels of porous templates, arranging the templates in a predetermined pattern on a substrate and selectively removing the templates to expose the carbon nanotubes.

14 Claims, 5 Drawing Sheets

(A)  (B)  (C)  (D)

METHOD OF PREPARING PATTERNED CARBON NANOTUBE ARRAY AND PATTERNED CARBON NANOTUBE ARRAY PREPARED THEREBY

This application claims priority to Korean Patent Application No. 10-2006-0047465 filed on May 26, 2006, and all the benefits accruing therefrom under 35 U.S.C. §119, the contents of which are herein incorporated by reference in its entirety.

BACKGROUND OF THE INVENTION

1. Field of the Invention

The present invention relates, to a method of preparing a patterned carbon nanotube array and a patterned carbon nanotube array prepared thereby. More particularly, the present invention relates to a method of preparing a patterned carbon nanotube array in which carbon nanotubes ("CNTs") are uniformly arranged using porous templates, to a patterned CNT array prepared thereby and to a transparent electrode including the patterned CNT array and thus having high light transmittance.

2. Description of the Related Art

In accordance with the rapid development of information and communication technologies and the requirement for visualization of various information data, the demand for electronic displays continues to increase. Therefore, displays having a large size, a low price, high performance, high definition, slimness, and light weight are required. Particularly, corresponding to the ubiquitous computing era, in which information data can be obtained regardless of time and place, as a medium able to transfer the data anytime and anyplace, a flat panel display, which is easily portable, light, and slim, may be realized in a predetermined panel form, and further, may be folded like paper or rolled, is increasingly required to be developed.

Such a flat panel display includes a transparent electrode requiring fine patterning of a transparent conductive film. In order to realize the flexible display, an electrode material having high light transmittance and electrical conductivity and being flexible must be used.

The transparent electrode used in flat panel displays, such as plasma display panels ("PDPs"), field emission devices ("FEDs"), or vacuum fluorescent displays ("VFDs"), or in solar cells, is prepared by applying conductive metal oxide, such as indium oxide, indium tin oxide ("ITO"), tin oxide, aluminum tin oxide ("ATO"), or aluminum zinc oxide.

As such, the conductive metal oxide is applied through a sputtering process or a spray pyrolysis process, which is nevertheless disadvantageous because it is expensive and thus unsuitable for mass production. Further, in the flexible display, a conventional glass substrate should be replaced with a transparent flexible plastic substrate. In the case where the ITO transparent electrode is applied on the plastic substrate, it may be deformed due to the difference in coefficient of thermal expansion from the substrate, undesirably worsening adhesion or electrical conductivity.

With the goal of overcoming such problems, efforts have been made to provide transparent electrodes to replace the metal oxide film including ITO. For example, although techniques of suspending ITO particles in a polymer binder have been proposed, this ITO filled system cannot match the electrical conductivity of a continuous ITO film.

Furthermore, transparent conductive polymer materials are now being developed, such polymers typically requiring dopants to impart conductive properties. However, the presence of dopants is expected to have an adverse effect on control of the conductive properties, and may not be compatible with device miniaturization.

As the CNT network has been proven to have interesting electronic properties, such as electron mobility of 270 cm$^2$/Vs (squared centimeters per Volt-second) and a transistor on-off ratio of about 10$^4$, techniques of binding originally flexible CNTs to a flexible polymer substrate to pattern them are receiving attention. The presently available patterned CNT array has been mainly prepared using a simple printing process or by preparing CNTs in a state of a photosensitive paste composition, which is then formed into a desired pattern through photolithography.

In this regard, Korean Patent Laid-open Publication No. 2005-35191 discloses a method of patterning a CNT coating by applying a CNT solution on a substrate to form a solid-state film, selectively impregnating the CNT film with a binder, and removing the portion of the film which is not impregnated with the binder.

In addition, Korean Patent Laid-open Publication No. 2005-108122 discloses a method of forming a finely patterned CNT array by patterning a photosensitive CNT paste through back exposure and removing the non-exposed portion using an organic solvent.

However, in the case where the pattern is formed using a photolithographic process, the patterning process is complicated and incurs a high cost. Further, in the case where the pattern is formed using a general printing process, the pattern has limited precision and thus is difficult to use to form a fine pattern.

As shown in FIG. 1, since CNTs 200 are not regularly formed but are randomly arranged, the uniformity of thickness and transmittance (as indicated by the arrows) are decreased. Consequently, when such CNTs 200 are applied to the transparent electrode 100 of a display or a photovoltaic device, problems occur in which the image quality of the display is deteriorated or the photovoltaic efficiency of the photovoltaic device is decreased.

BRIEF SUMMARY OF THE INVENTION

An exemplary embodiment provides a method of preparing a patterned CNT array, which can form a uniform pattern and can prepare a patterned CNT array through a continuous process even without the use of a complicated photoresist process.

An exemplary embodiment provides a patterned CNT array, which has improved array uniformity and transmittance.

Exemplary embodiments provide a transparent electrode including the patterned CNT array, which may be easily prepared and has high transmittance, and various electronic devices incorporating it.

An exemplary embodiment provides a method of preparing a patterned CNT array, the method including respectively forming CNTs in pluralities of hollow channels of porous templates, arranging the templates having the CNTs, in a predetermined pattern on a substrate and selectively removing the templates and exposing the CNTs.

In an exemplary embodiment, the arranging of the templates having the CNTs may include arranging the templates at a predetermined interval on the substrate or by weaving the templates having CNTs.

An exemplary embodiment may further include repeatedly alternating the arranging templates having CNTs, in a predetermined pattern on the exposed CNTs and selectively removing the templates arranged in the predetermined pattern thereby forming multiple layers of the exposed carbon nanotubes, such that a patterned CNT array may be multilayered. Since it is possible to obtain a patterned CNT array having relative high pattern uniformity, a conductivity and degree of integration may be increased while transmittance is not significantly decreased.

In an exemplary embodiment, the template may be removed through chemical etching, wet etching or pyrolysis. Where the templates are removed through chemical etching, the templates may be selectively removed using an acid or a base.

An exemplary embodiment provides a patterned CNT array, in which CNTs are regularly arranged or woven on a transparent substrate.

An exemplary embodiment provides a transparent electrode including the patterned CNT array formed according to the method described above. The transparent electrode may be a flexible transparent electrode.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF THE INVENTION

Figure 1:
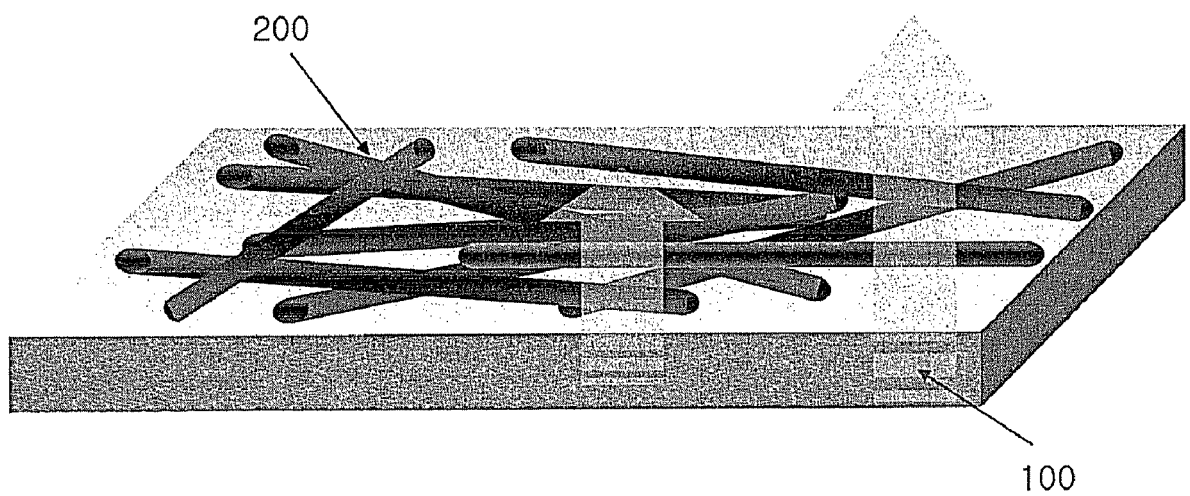
FIG. 1 is a schematic view of a transparent electrode using CNTs according to a conventional technique in the prior art.

The invention is described more fully hereinafter with reference to the accompanying drawings, in which exemplary embodiments of the invention are shown. This invention may, however, be embodied in many different forms and should not be construed as limited to the exemplary embodiments set forth herein. Rather, these embodiments are provided so that this disclosure will be thorough and complete, and will fully convey the scope of the invention to those skilled in the art. In the drawings, the size and relative sizes of layers and regions may be exaggerated for clarity.

It will be understood that when an element or layer is referred to as being "on" another element or layer, the element or layer can be directly on another element or layer or intervening elements or layers. In contrast, when an element is referred to as being "directly on" "another element or layer, there are no intervening elements or layers present. Like numbers refer to like elements throughout. As used herein, the term "and/or" includes any and all combinations of one or more of the associated listed items.

It will be understood that, although the terms first, second, third, etc., may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present invention.

Spatially relative terms, such as "under," "above" and the like, may be used herein for ease of description to describe the relationship of one element or feature to another element(s) or feature(s) as illustrated in the figures. It will be understood that the spatially relative terms are intended to encompass different orientations of the device in use or operation, in addition to the orientation depicted in the figures. For example, if the device in the figures is turned over, elements described as "under" other elements or features would then be oriented "above" the other elements or features. Thus, the exemplary term "under" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

All methods described herein can be performed in a suitable order unless otherwise indicated herein or otherwise clearly contradicted by context. The use of any and all examples, or exemplary language (e.g., "such as"), is intended merely to better illustrate the invention and does not pose a limitation on the scope of the invention unless otherwise claimed. No language in the specification should be construed as indicating any non-claimed element as essential to the practice of the invention as used herein. Unless defined otherwise, technical and scientific terms used herein have the same meaning as is commonly understood by one of skill in the art to which this invention belongs.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

Hereinafter, a detailed description will be given of the present invention, with reference to the appended drawings.

An exemplary embodiment provides a method of preparing a patterned CNT array including loading CNTs into pluralities of hollow channels of porous templates or growing them in the channels, arranging such templates on a substrate, such as a polymer film, and selectively removing only the templates, thus forming a patterned CNT array.

Figure 2:
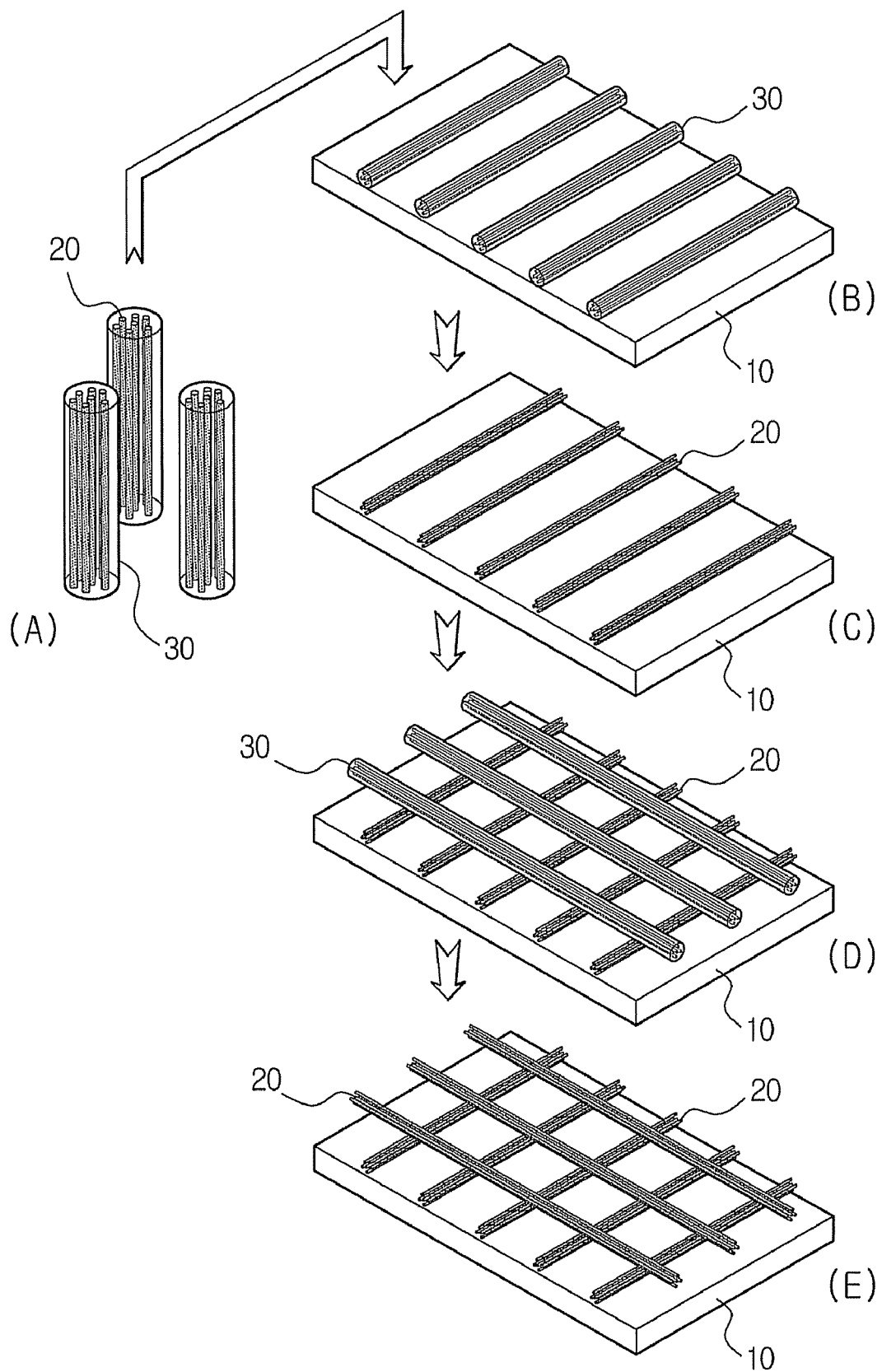
FIGS. 2A-2E are schematic views showing an exemplary embodiment of a process of preparing a patterned CNT array according to the present invention.

FIGS. 2A-2E illustrate an exemplary embodiment of a process of preparing a patterned CNT array according to the present invention. As illustrated in FIG. 2A, in order to form the patterned CNT array, CNTs 20 are formed in pluralities of hollow channels of porous templates 30. Subsequently, the templates 30 having the CNTs 20 thus obtained are arranged in a predetermined pattern on a substrate 10 (FIG. 2B), and then only the templates 30 are selectively removed, resulting in exposed CNTs 20 (FIG. 2C).

Additional CNTs 20 formed in porous templates 30 are arranged on the previous group of exposed CNTs 20 as illustrated in FIG. 2D. The templates 30 are selectively removed resulting in a subsequent "layer" of exposed CNTs 20 (FIG. 2E). Such a process may continue until a predetermined number of layers of exposed CNTs 20 are achieved. While two layers of exposed CNTs 20 are illustrated in FIGS. 2A-2E, the invention is not limited thereto.

In an exemplary embodiment, the preparation of the CNTs 20 may include forming metal nanoparticles in the hollow channels of the porous templates 30 and then growing them into CNTs through a VLS process.

Figure 3:
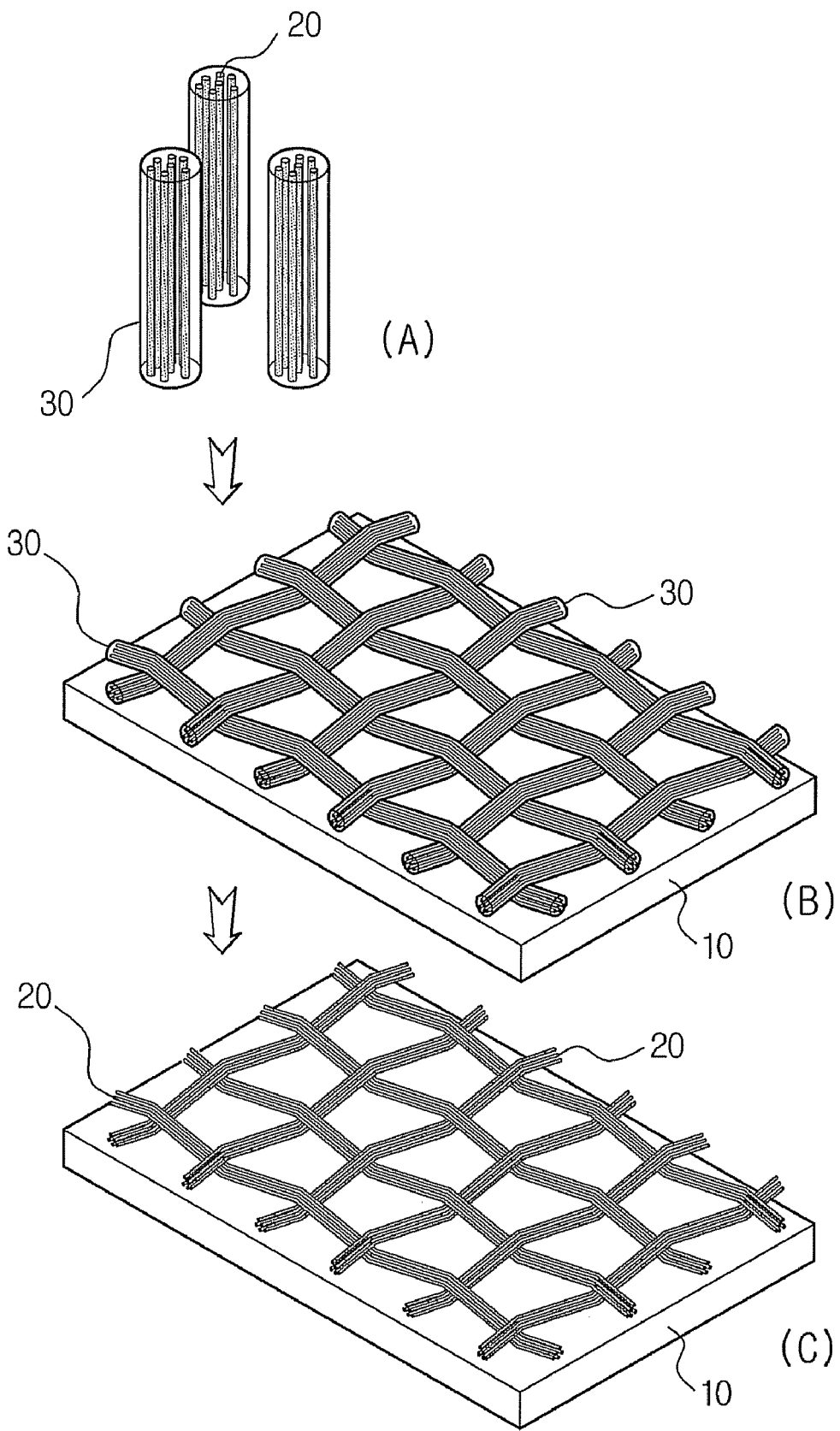
FIGS. 3A-3C are schematic views showing another exemplary embodiment of a process of preparing a patterned CNT array according to the present invention.

In the exemplary embodiment as shown in FIG. 3, the patterned CNT array may be formed in a manner such that fiber-shaped porous templates are woven like a woven fabric into a predetermined pattern and then only the templates are selectively removed.

CNTs 20 are formed in pluralities of hollow channels of porous templates 30 as illustrated in FIG. 3A. The templates 30 having the CNTs 20 are "woven" in a predetermined pattern on a substrate 10 (FIG. 3B). The templates 30 are arranged in a substantially matrix shape with the templates 30 positioned in columns and rows. The templates 30 in a row direction (e.g., transverse to a longitudinal direction of the substrate 10) are alternately arranged under and above templates 30 in a column direction (e.g., the longitudinal direction of the substrate 10) as they cross the templates 30 in the column direction. The templates 30 are selectively removed, resulting in exposed CNTs 20 (FIG. 3C).

Below, an exemplary embodiment of a method of preparing the patterned CNT array of the present invention is stepwisely described.

a) Formation of CNTs

The porous templates having the CNTs may be obtained by injecting a CNT-dispersed solution into the channels of the porous templates using capillarity, or by directly growing CNTs in the channels. In exemplary embodiments, the process of forming the CNT using the porous template is not particularly limited, but may be varied.

In exemplary embodiments where the CNT-dispersed solution is formed into CNTs using capillarity, the CNTs are dispersed in a solvent having a low boiling point and are injected into the channels of the templates using capillarity. CNTs in an amount of 0.001 to 10 parts by weight per 100 parts by weight of the solvent when channels of the template are filled with the CNT solution. To expose the CNTs, the solvent is removed.

In exemplary embodiments where the CNTs are prepared using the porous templates, as shown in FIGS. 3A-3C, porous long templates having pluralities of hollow channels are prepared, after which CNTs are formed through a VLS process using catalyst particles which have already been provided in the pores of the templates.

A size (e.g., diameter) of the porous template, a length of the porous template, size (e.g., diameter of the hollow channels and/or intervals between the hollow channels of the porous template may be adjusted to a required specification, thereby easily controlling the shape and regularity of the resultant patterned CNT array. In exemplary embodiments, the porous template may have a diameter ranging from about 1 nanometer (nm) to about 1 millimeter (mm) and a length ranging from about 50 nm to about 1 mm. The hollow channels of the porous template may have a diameter ranging from about 1 nm to about 100 nm. An interval between the hollow channels may range from about 2 nm to about 1 micrometer (μm).

In an exemplary embodiment, the template may be formed of a material selected from the group consisting of glass, silica, and metal oxide, such as $TiO_2$, $ZnO$, $SnO_2$, or $WO_3$.

In exemplary embodiments, the preparation of the template may include making a template base and taking the template having a predetermined shape from the base. The formation of the hollow channel varies depending on the sampling rate of the sampling process and the cooling condition. In particular, when the shape of desired hollow channels is previously processed in the base, it is possible to obtain a structure in which the original shape is decreased to a nanosize through the taking process.

In exemplary embodiments where the CNTs are formed using a VLS process, the inner wall of the channel of the porous template is coated with a metal catalyst. The process of coating the inner wall of the channel of the porous template with the metal catalyst may be conducted by injecting a metal particle solution into the channel using capillarity or filling the channel of the template with a metal precursor, followed by pyrolysis or reduction.

As the metal catalyst, any of a number of metal catalysts may be used so long as it grows CNTs. Exemplary embodiments of the metal catalyst include, but are not limited to, Au, Ni, Fe, Ag, Pd, and Pd/Ni. The metal catalyst may be applied on the inner wall of the channel in the form of nanoparticles or a thin film.

Figure 4:
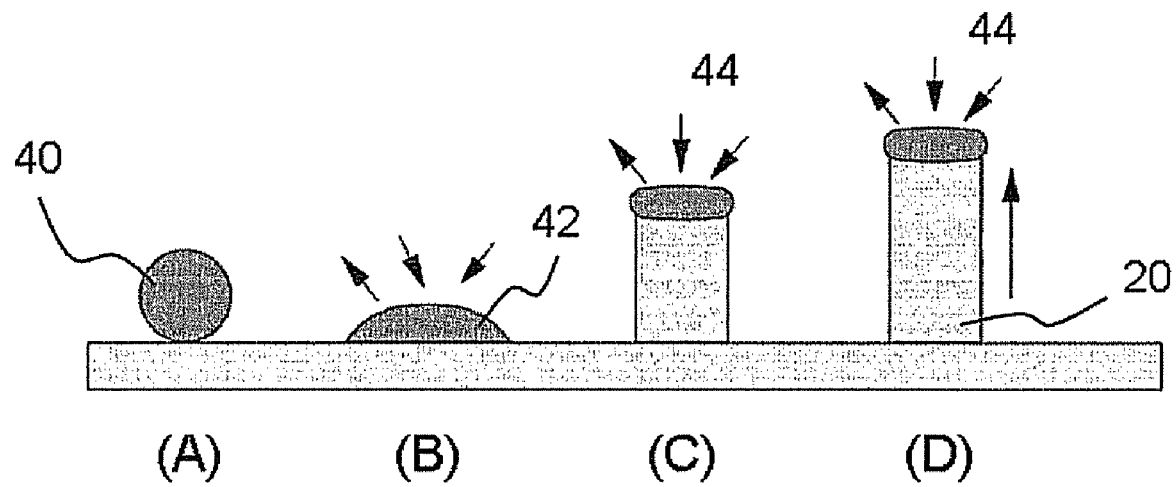
FIG. 4 is a schematic view showing an exemplary embodiment of a process of forming a CNT through VLS (Vapor-Liquid-Solid)

FIG. 4 is a schematic view showing an exemplary embodiment of a process of forming a CNT through VLS (Vapor-Liquid-Solid. As shown in FIG. 4, the VLS process is a technique of growing CNTs by transporting vapor phase carbon-containing species into a hot furnace, and condensing and crystallizing them to carbon on the surface of the molten catalyst such as gold, cobalt, nickel, etc.

A metal catalyst 40 is deposited on a surface (FIG. 4A). While in the hot furnace (e.g., heat indicated by the arrows), the metal catalyst becomes molten catalyst 42 (FIG. 4B). The vapor phase carbon-containing species 44 is introduced into the furnace and condensed and crystallized onto the surface of the molten catalyst 42 (FIG. 4C). CNTs are grown (FIG. 4D) by the vapor phase carbon-containing species 44 being condensed and crystallized onto the surface of the molten catalyst 42.

In an alternative embodiment, the VLS process may be carried out by loading the porous template into the furnace and heating it while supplying a gas and a CNT source, thus forming the CNT.

In exemplary embodiments, the gas used in the VLS process may be selected from the group consisting of Ar, $N_2$, He, and $H_2$, but the present invention is not limited thereto.

In one exemplary embodiment, the VLS process may be performed at about 370° C. to about 600° C. under pressure of about 760 torr or less.

b) Arrangement of Templates

When the CNTs are formed in the hollow channels of the porous templates, the resulting templates are arranged in a predetermined pattern on the substrate. As such, intervals between the CNTs may be adjusted by controlling the diameter of the templates used in the formation of the CNTs.

Referring again to FIGS. 2A-2E, the templates 30 having the CNTs 20 formed in the channels thereof are arranged (FIG. 2B) and then only the templates 30 are selectively removed (FIG. 2C), so that the patterned CNT array is formed in a first direction (e.g., the transverse direction). The processes of arranging templates 30 having CNTs 20 in a predetermined pattern in a second direction (FIG. 2D) on the previously exposed CNTs 20 and then selectively removing the templates 30 to expose another group of CNTs are repeated, thus forming a lattice pattern (See, FIG. 2E).

Figure 5A:
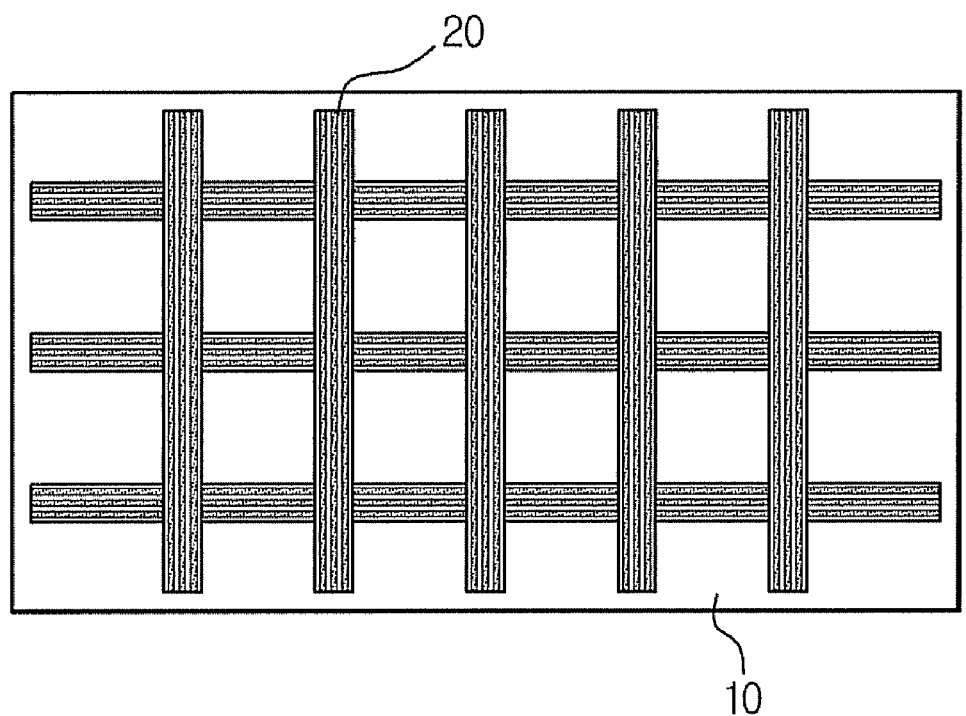
FIGS. 5A and 5B are plan views showing exemplary embodiments of a patterned CNT array according to the present invention.
Figure 5B:
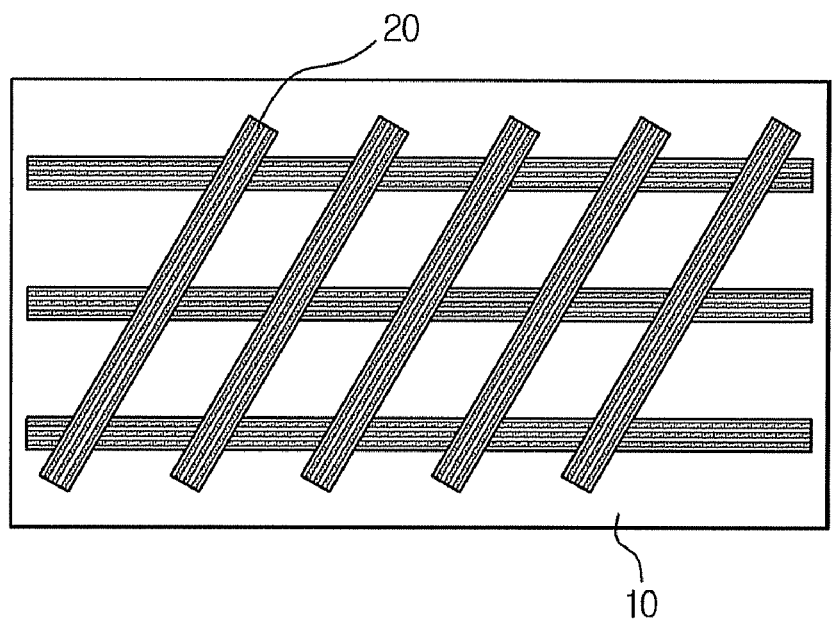

The shape of the patterned CNT array is not particularly limited. In exemplary embodiments, where a second layer of a patterned CNT array is provided on the first layer of a patterned CNT array resulting from the arrangement of templates and selective removal thereof, templates for the formation of the second layer may be arranged substantially perpendicular to the templates in the first layer, thus obtaining a patterned CNT array as shown in FIG. 5A. In an alternative exemplary embodiment, upon the formation of the second layer with respect to the first templates, the second templates may be arranged at a predetermined tilt angle (e.g., diagonally), resulting in a patterned CNT array as in FIG. 5B.

In an exemplary embodiment, the process of arranging the templates may include weaving templates having CNTs formed in channels thereof like fibers. Such a process is illustrated in FIGS. 3A-3C. As illustrated in FIGS. 3A-3C, since the size of the template is similar to or thinner than a conventional glass fiber, the templates may be woven like a woven fabric using a substantially same process as the process of weaving glass fibers. In the weaving process, the templates may or may not be relatively densely woven depending on the purposes of the CNT pattern. The intervals of the patterns may be adjusted by controlling the diameter of the templates used in the weaving process.

c) Removal of Templates

After the porous templates are arranged in a predetermined pattern, the templates are selectively removed. The templates may be removed by any of a number of methods, such as through wet etching, dry etching and/or pyrolysis. Thereby, the patterned CNT array is formed on the substrate in substantially the same shape as the pattern in which the templates are originally arranged. The process of selectively removing the templates may include photoetching as well as chemical etching.

In an exemplary embodiment, the wet etching process is an etching technique that uses an acidic or basic etchant capable to selectively remove only the templates. The etchant may include, but is not limited to, an aqueous acetic acid solution, hydrofluoric acid or an aqueous phosphoric acid solution.

In an exemplary embodiment, the dry etching process is an etching technique that may use gas, plasma and/or ion beam. Exemplary embodiments of the dry etching process include, but are not limited to, reactive ion etching ("RIE") for activating reactive gas in a plasma state to chemically react with an etching target material, thus volatilizing such a material and etching it, or inductive coupled plasma (ICP)-RIE using the ICP as an active source. In exemplary embodiments where CNTs are arranged on a polymer substrate, a wet etching process is preferable.

As in the illustrated embodiments where the patterned array is multilayered, it is preferred that arrangement of the pattern of each layer and then removal of the templates be sequentially conducted. In one exemplary embodiment, when a lattice pattern composed of double-layer CNTs is formed, templates are arranged in a longitudinal direction and then selectively removed, thus exposing the CNTs on which other templates are then arranged in a transverse direction and then selectively removed, leading to the lattice pattern.

In an alternative embodiment, after the templates are aligned in a double layer, the templates of the multiple layers may be removed at substantially the same time. However, in consideration of the performance of the patterned CNT array, the process of removing the templates is preferably carried out for the patterned CNT array of each layer separately.

As shown in FIGS. 3A-3C, where the porous templates having the CNTs formed in respective hollow channels thereof are woven, the porous templates may be removed through the above-mentioned process (e.g., the templates of the multiple layers may be removed at substantially the same time) after the completion of the weaving process.

Figure 6:
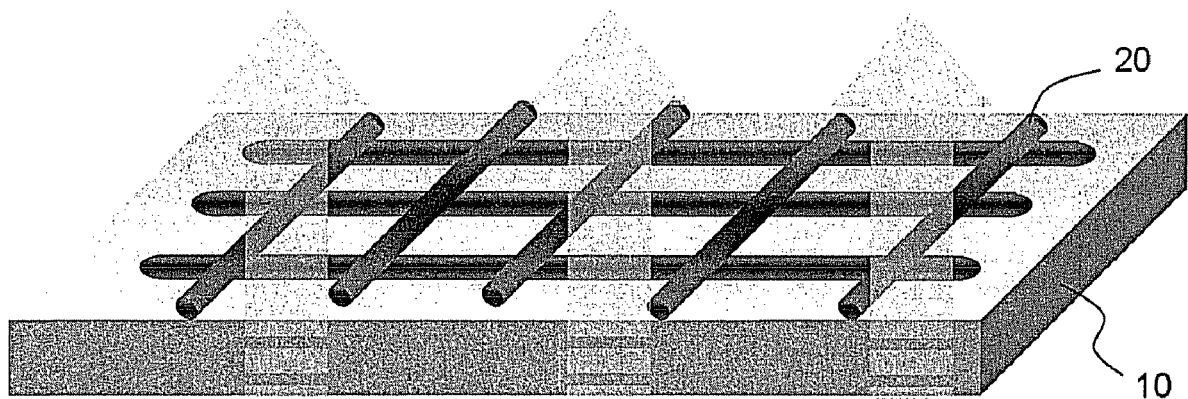
FIG. 6 is a schematic view of an exemplary embodiment of the patterned CNT array according to the present invention.

An exemplary embodiment of the patterned CNT array resulting from the illustrated embodiment of the method, is schematically shown in FIG. 6. As shown in FIG. 6, the patterned CNT array of the present invention includes CNTs 20 arranged in a predetermined pattern on a substrate 10. Since the CNT 20 is formed using the porous template 30, it may be composed of a single strand or a plurality of strands. The patterned CNT array may be formed in a multilayer so as to cross-link the CNT strands.

The material for the substrate 10 is not particularly limited, but any of a number of materials may be used so long as it is effective as the substrate of a transparent electrode. Materials for the substrate include, but are not limited to, a glass substrate, a silicon wafer, a polymer substrate or a combination including at least one of the foregoing.

In exemplary embodiments, when the electrode of a flexible display is formed into a flexible transparent electrode, the substrate itself may be prepared using a flexible polymer. The transmittance of the patterned CNT array as in the illustrated embodiments may be further increased compared to a conventional patterned CNT array because the inventive CNTs are not randomly formed, but are formed to a substantially uniform thickness, in a substantially uniform pattern and are used in a relatively small amount. The transparent electrode formed using the patterned CNT array in the illustrated embodiments has a relatively high light transmittance of 80% (shown by the arrows in FIG. 6) or more and low electrical resistance of less than 100Ω (Ohms) (i.e., high electrical conductivity).

The patterned CNT array of the illustrated exemplary embodiments may be used to manufacture the transparent electrode. Such a transparent electrode may be applied as transparent electrodes of various electronic devices. In exemplary embodiments, the transparent electrode of the present invention may be employed in the circuit and transparent electrode for electromagnetic interference (EMI) shielding, electroluminescent (EL) lamps, touch screens, photovoltaic devices and flat panel displays.

In exemplary embodiments where the transparent electrode of the present invention is used in the transparent electrode of a flat panel display such as a plasma display panel ("PDP"), a liquid crystal display, a field emission device ("FED"), a vacuum fluorescent display ("VFD"), etc., the uniformity of the patterned CNT array is relatively high and the transmittance of the transparent electrode is increased, thus improving the image quality of the flat panel display.

A better understanding of the present invention may be obtained in light of the following example, which is set forth to illustrate, but is not to be construed to limit the present invention.

EXAMPLE

A CNT-dispersed chloroform solution was injected into the channels of porous templates in an amount the same as the volume of the porous channels using capillarity. The procedures of filling the channels with the CNTs using capillarity and then drying the solvent were repeated one or more times, depending on the desired CNT concentration.

The drying process was conducted in an oven at 150° C. for 6 hours or longer. A 0.2 wt % CNT/chloroform solution was supplied into the channels of silica porous templates having the volume of 1 cc/g. The supply and drying processes were repeated two times, after which the porous templates having the CNTs were arranged on a polycarbonate substrate.

Only the silica templates were selectively removed from the CNTs/templates arranged on the polymer substrate using a 5 wt % fluoric acid solution. On the polymer substrate having the CNTs arranged thereon, the arrangement of CNTs/templates and selective removal of templates were repeated.

Exemplary embodiments provide a method of preparing a patterned CNT array and a patterned CNT array prepared thereby. As in the illustrated embodiments, a patterned CNT array having high transmittance and precision can be obtained without the use of a photolithographic process, which is complicated and incurs a high cost, thus decreasing the process cost and increasing the yield.

The patterned CNT array of the illustrated embodiments has excellent uniformity and the transmittance thereof is increased because the CNTs are used in a small amount. Further, since a transparent electrode formed using the CNTs has relatively negligible problem of material-processing incompatibility with a polymer substrate, the method of preparing a patterned CNT array may be effectively used as a core technique in the preparation of a transparent electrode for a flexible display.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A method of preparing a patterned carbon nanotube array, the method comprising:
   providing a plurality of porous templates, each of the porous templates including a plurality of hollow channels formed therein;
   respectively forming carbon nanotubes in each of the plurality of hollow channels of the porous templates;
   arranging the plurality of porous templates including the carbon nanotubes in a predetermined pattern on a surface of a substrate, wherein a longitudinal direction of the plurality of porous templates is disposed substantially parallel to the surface of the substrate; and
   selectively removing the plurality of porous templates and exposing the carbon nanotubes on the substrate.

2. The method as set forth in claim 1, wherein forming the carbon nanotubes includes filling the hollow channels of the porous templates with the carbon nanotubes dispersed in a solvent using capillary action and removing only the solvent.

3. The method as set forth in claim 1, wherein forming carbon the nanotubes includes loading porous templates with a metal catalyst provided in the hollow channels thereof into a furnace and heating the porous templates while supplying a gas and a carbon nanotube source to directly grow the carbon nanotubes in the hollow channels.

4. The method as set forth in claim 1, wherein arranging the porous templates including the carbon nanotubes includes arranging an adjacent pair of the porous templates disposed separated from each other at a predetermined interval on the surface of the substrate.

5. The method as set forth in claim 4, wherein
   each of the porous templates includes an outer wall within which the carbon nanotubes are disposed, and
   outer walls of the adjacent pair of the porous templates are disposed separated from each other at the predetermined interval on the surface of the substrate.

6. The method as set forth in claim 1, further comprising repeatedly alternating, one or more times:
   the arranging templates including carbon nanotubes, at a predetermined interval on the exposed carbon nanotubes, and
   selectively removing the templates at the predetermined interval,
   wherein multiple layers of the exposed carbon nanotubes are formed.

7. The method as set forth in claim 6, wherein the arranging the templates at the predetermined interval includes tilting the templates at the predetermined interval, at a predetermined angle to control an angle of the carbon nanotubes from the templates at the predetermined interval disposed on the exposed carbon nanotubes.

8. The method as set forth in claim 1, wherein the arranging the templates including carbon nanotubes includes weaving the templates.

9. The method as set forth in claim 1, wherein the porous template is formed of a material selected from the group consisting of glass, silica, and metal oxide, including $TiO_2$, $ZnO$, $SnO_2$, or $WO_3$.

10. The method as set forth in claim 1, wherein the porous template has a diameter from 1 nm to 1 mm and a length from 50 nanometers (nm) to about 1 millimeter (mm).

11. The method as set forth in claim 1, wherein the hollow channels of the porous template have a diameter from about 1 nm to about 100 nm and an interval between the hollow channels is about 2 nm to about 1 micrometer (μm).

12. The method as set forth in claim 1, wherein the substrate includes one of glass, silica, a flexible polymer or a combination including at least one of the foregoing.

13. The method as set forth in claim 1, wherein selectively removing the porous templates includes one of wet etching, dry etching or pyrolysis or a combination including at least one of the foregoing.

14. The method as set forth in claim 1, wherein wet etching includes using an acid or a base.

* * * * *